Dec. 1, 1925.
W. T. GRIFFIN
1,563,565
DITCH DIGGING MACHINE
Filed Dec. 29, 1924
2 Sheets-Sheet 1
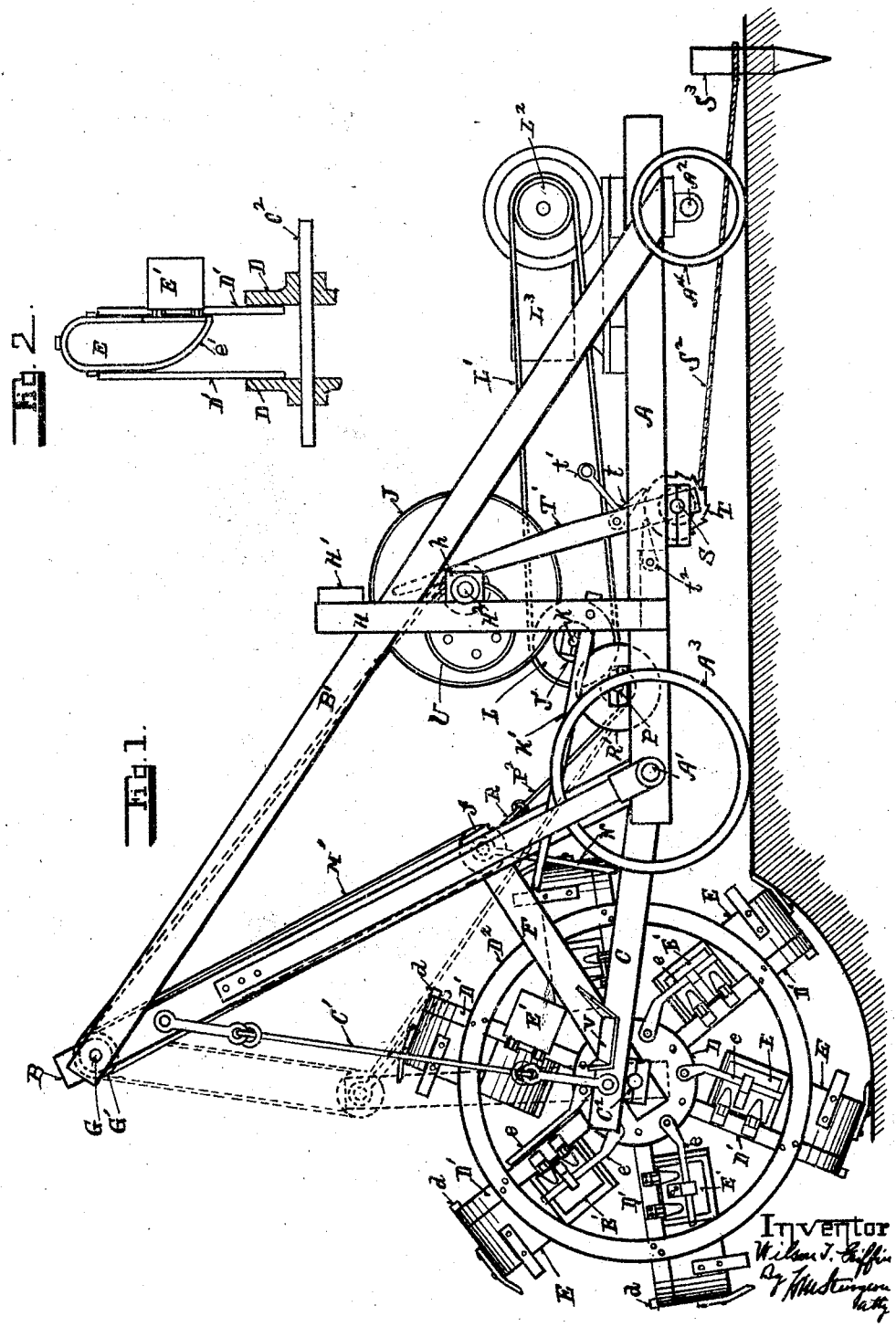

Dec. 1, 1925.

W. T. GRIFFIN 1,563,565

DITCH DIGGING MACHINE

Filed Dec. 29, 1924

Inventor.
Wilbour T. Griffin

Patented Dec. 1, 1925.

1,563,565

UNITED STATES PATENT OFFICE.

WILSON T. GRIFFIN, OF NORTH EAST, PENNSYLVANIA.

DITCH-DIGGING MACHINE.

Application filed December 29, 1924. Serial No. 758,621.

*To all whom it may concern:*

Be it known that I, WILSON T. GRIFFIN, a citizen of the United States, residing at North East, in the county of Erie and State of Pennsylvania, have invented certain new and useful Improvements in Ditch-Digging Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to ditch digging machines and the object thereof is to provide a machine adapted to excavate trenches for water pipes and drains, which is simple in construction and operation, and which can be constructed at comparatively low cost.

The features of my invention are hereinafter described and pointed out and are illustrated in the accompanying drawings in which:

Figure 1 is a side elevation of my improved ditch digging machine.

Figure 2 is a front view of one of the shovel scoops of my invention.

Figure 3:
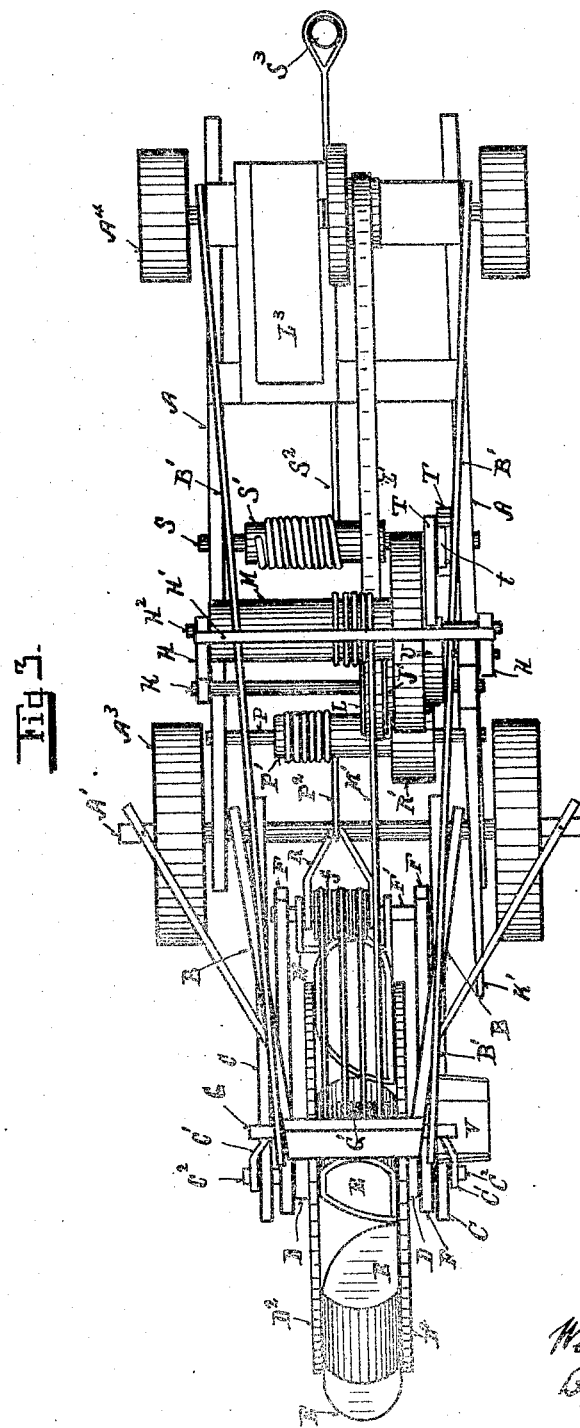
Figure 3 is a plan view of my machine.

In these drawings A indicates the side beams, A' and A² indicate the rear and front axles, and A³ and A⁴ indicate the rear and front supporting wheels of the machine.

Mounted on the rear end of the machine, preferably upon the rear axle A', are hoisting spars B which are supported in a rearwardly inclined position, as shown in Fig. 1, by means of braces B', which are secured to the front ends of the side beams A and to the upper ends of the hoisting spars B. Pivoted to the rear end of the machine, preferably on the rear axle A', are arms C, the outer ends of which are suspended upon cables C' to the spars B, said cables C' being adjusted to give said arms C the desired elevation. Mounted upon the arms C is a transverse shaft C² upon which is placed a pair of spaced apart disc-hubs D. Secured to said disc-hubs are radial arms D', and secured to said radial arms are braces, preferably rings D², to give necessary stability to said radial arms D'. Secured between the outer ends of said radial arms D' are shovel-scoops E, which are closed at the back and open at the front. The outer or cutting ends of the shovels E are semi-circular, see Fig. 2, one side of said shovel is flat and is provided with an opening, which is closed by means of a hinged door, said door being secured in a closed position by a latch bar *e* which is pivoted to a disc-hub D, see Fig. 1. The opposite wall of the shovel E curves, at *e'*, over to meet the straight side of the shovel E, as shown in Fig. 2, so that when the shovel reaches the upper portion of its circular travel the contents thereof will slide out when the door E' is opened, as hereafter described.

Mounted on the transverse shaft C² at each side of the disc-hubs are arms F, in the free ends of which is mounted a transverse shaft F', see Fig. 3, upon which are placed pulley-wheels *f*, see Fig. 3 and indicated by broken lines in Fig. 1, said pulley being adapted to carry chains or cables.

Mounted in the upper ends of the hoisting spars B and braces B' is a transverse shaft G upon which is placed another series of cable-pulleys G'.

Upon the side beams A of the machine I place uprights H, the upper ends of which are tied together by means of a cross-bar H'. Mounted in suitable bearings *h* secured on said uprights H is a transverse shaft H² upon which is placed a friction wheel J, against which a friction pulley J' is adapted to be engaged, as hereafter described. The friction pulley J' is secured upon a shaft K journalled on a lever K' which is fulcrumed upon one of the uprights H, see Fig. 1, and secured upon said shaft K is a power pulley L adapted to receive a belt L' which extends to a pulley L² of a motor L³, so that power generated by the motor L³ will be communicated to the pulley L and friction pulley J'.

Upon the shaft H² is a winding drum M see Fig. 3, upon which a cable or chain M' is wrapped which extends around the cable pulleys *f* and G', by means of which the swinging arms F can be swung upwardly as shown by broken lines in Fig. 1. Mounted on the transverse shaft F' in the ends of the swinging arms F is a stirrup N which is adapted to embrace one of the shovel-scoops E and hook under the shoulder *d* on the bottom thereof, so that when said arms F are caused to swing upward by the cable M', the shovels E will rotate around their axis until the shovel so engaged by said stirrup reaches its upper position. The cable drum M is caused to rotate by the operator raising the lever K' until the friction pulley J' engages the friction wheel J. When the arms F have been swung upward as far as desired the operator lowers the lever K' enough to separate the friction pulley from the friction wheel.

Mounted upon the side beams A is a transverse shaft P upon which is placed another cable drum P', see Fig. 3, from which a cable P² extends to a loop R which is secured to the transverse shaft F' in the free ends of the swinging arms F. The cable drum P' is provided with a friction pulley R', with which the friction pulley J' engages when the lever K' is continued in its downward movement by the operator, so that power from the friction pulley J' will cause the cable drum to wind up the cable P² and draw the swinging arms F downward, unwinding the cable M' from the drum M, and turning the friction wheel backward, until the stirrup can be hooked under the next succeeding scoop, the lever K' serving to alternately operated both the lifting and down pull cables.

In order to move the machine forward with a suitable rate of feed speed, I provide a transverse shaft S which is mounted on the side beams A of the machine, upon which is a cable drum S', from which a cable S² extends to an anchor S³ which may be located as far ahead as the length of the cable permits. To operate the shaft S and drum S' I provide a toothed wheel, T, on the shaft S, and pivot on said shaft a lever T', which is provided with a dog t. I also provide an arm t' on the dog t by means of which the dog can be lifted out of engagement with the toothed wheel T when desired. Another dog t² shown in broken lines in Figure 1, is provided to prevent unwinding of the cable drum S'.

Upon the side of the friction wheel J, an eccentric U is secured, which engages the free end of the lever T', which causes the cable drum S' to draw on the cable S² at each rotation of the friction wheel J, with the result of a forward movement of the machine with relation to the cutting action of the scoop E. The eccentric, U, operating the lever T' whether the friction is winding or unwinding the hoisting cable M'. When desired the dog t can be raised to stop the forward travel of the machine, without stopping the operation of the scoops.

Upon the arm C, I place a chute V to receive the material discharged from the scoop when the doors E' are opened, from which it can be removed as desired.

In operation, the machine is placed in the position desired, and the motor started in operation which causes the friction pulley J' to revolve. The scoops are lowered upon the ground, and the lever K is raised by the operator until it engages and rotates the friction wheel J which through the cable M causes the arms F to swing upward, the stirrup N hooking under a scoop E and causing the scoops to rotate in unison with the upward swing of the arms F. When the arms F have reached their upward limit, the operator lowers the lever K' so that the friction pulley J', engages the friction wheel on the cable drum P', which causes the cable P² to draw the swinging arms F down to their starting point so that the stirrup N can be hooked under the next scoop E, the cable M' unwinding from the drum M, causing the friction wheel J and eccentric U, thereon, to revolve backward. While this operation is repeated until the scoops F have excavated to the depth desired, the dog t is raised out of engagement with the toothed wheel T so that the machine is not caused to move forward. When the desired depth of cut is reached, the cables C' are adjusted to support the arms C so that the scoops will not cut below the depth desired, and the dog t is lowered into engagement with the toothed wheel T, so that with each oscillation of the lever T' caused by the eccentric U the machine will be drawn forward. When a filled scoop is raised to its upward position, the operator swings its latch arm e out of engagement with the door E' and the contents of the scoop slides onto the chute V. The operator then closes the door E'. The operation is repeated as desired.

Having thus shown and described my invention so that others can utilize the same, what I claim as new and desire to secure by Letters Patent is:

1. In a machine of the class described, a series of scoops arranged to rotate around a common axis, and hoisting mechanism adapted to engage each upcoming scoop and lift it to its uppermost position.

2. In a machine of the class described, a wheel, a series of scoops secured in said wheel, swinging arms mounted on the axis of said wheel, a stirrup supported on the free ends of said arms and adapted to hook around one of said scoops, and hoisting mechanism adapted to lift the free ends of said arms upwardly.

3. In a machine of the class described, a wheel, a series of scoops radially secured in said wheel, means to support said wheel at the desired elevation with relation to the surface of the ground, and hoisting mechanism adapted to engage an upcoming scoop and rotate said wheel, and means to release the contents of said scoops.

4. In a machine of the class described, supporting wheels, side beams supported thereon, hoisting mechanism mounted on said beams, trench digging mechanism carried upon said side beams and adapted to be operated by said hoisting mechanism, and lever, ratchet and cable mechanism adapted to be operated by said hoisting mechanism to move said machine forward.

5. In a machine of the class described, a frame supported on wheels, a trench digging wheel supported on said frame, swinging arms pivoted on the axis of said wheel, cable mechanism to swing said swinging arms upward, means carried by said arms adapted to engage said wheel and cause it to turn in unison with said arms, and cable mechanism adapted to draw said swinging arms downward.

6. In a machine of the class described, a frame supported on wheels, a trench digging wheel supported on said frame, swinging arms pivoted on the axis of said wheel, hoisting spars supported on said frame, hoisting cable gear supported on said spars, and attached to the free ends of said swinging arms, a cable drum supported on said frame to which said hoisting cable is attached, a friction wheel to rotate said hoisting cable drum, a power driven shaft, a friction pulley on said shaft, and lever mechanism to engage said pulley with said wheel, to cause said swinging arms to move upward.

7. In a machine as described in claim 6, a cable drum mounted on said frame, a cable secured to said drum and to said swinging arms, and a friction wheel adapted to be engaged by said friction pulley, to draw said swinging arms down.

8. In a machine of the class described, a friction wheel, an eccentric thereon, a power driven shaft, a friction pulley thereon adapted to engage and rotate said wheel, a transverse cable drum, a toothed wheel to rotate said drum, a lever adapted to be operated by said eccentric, ratchet mechanism operated by said lever adapted to engage said toothed wheel and rotate said drum, and an anchored cable secured to said drum, whereby said machine is caused to move forward.

In testimony whereof I affix my signature.

WILSON T. GRIFFIN.